(12) United States Patent
Solis et al.

(10) Patent No.: US 10,440,161 B2
(45) Date of Patent: Oct. 8, 2019

(54) AUTO-CONFIGURABLE TRANSPORT STACK

(71) Applicant: Cisco Technology, Inc., San Jose, CA (US)

(72) Inventors: Ignacio Solis, South San Francisco, CA (US); Glenn C. Scott, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/718,138

(22) Filed: Sep. 28, 2017

(65) Prior Publication Data

US 2018/0020084 A1 Jan. 18, 2018

Related U.S. Application Data

(63) Continuation of application No. 14/595,060, filed on Jan. 12, 2015, now Pat. No. 9,832,291.

(51) Int. Cl.
| | | |
|---|---|---|
| *G06F 15/177* | (2006.01) | |
| *H04L 29/08* | (2006.01) | |
| *H04L 12/24* | (2006.01) | |
| *G06F 8/20* | (2018.01) | |
| *G06F 8/36* | (2018.01) | |
| *G06F 9/445* | (2018.01) | |
| *H04L 29/06* | (2006.01) | |

(52) U.S. Cl.
CPC .............. *H04L 69/326* (2013.01); *G06F 8/20* (2013.01); *G06F 8/36* (2013.01); *G06F 9/44521* (2013.01); *H04L 41/0893* (2013.01); *H04L 67/1097* (2013.01); *H04L 67/125* (2013.01); *H04L 69/16* (2013.01); *H04L 69/18* (2013.01)

(58) Field of Classification Search
CPC ....... H04L 69/326; H04L 69/16; H04L 69/18; H04L 67/125; H04L 67/1097; G06F 8/20; G06F 8/36; G06F 9/44521
USPC ......................................................... 709/220
See application file for complete search history.

(56) References Cited

U.S. PATENT DOCUMENTS

| | | |
|---|---|---|
| 817,441 A | 4/1906 | Niesz |
| 4,309,569 A | 1/1982 | Merkle |
| 4,921,898 A | 5/1990 | Lenney |

(Continued)

FOREIGN PATENT DOCUMENTS

| | | |
|---|---|---|
| CN | 103873371 | 6/2014 |
| DE | 1720277 A1 | 6/1967 |

(Continued)

OTHER PUBLICATIONS

Xie et al. "Collaborative Forwarding and Caching in Content Centric Networks", Networking 2012.

(Continued)

*Primary Examiner* — Frantz B Jean
(74) *Attorney, Agent, or Firm* — Edell, Shapiro & Finnan, LLC

(57) ABSTRACT

A computer-implemented method includes: receiving an interest of an object in a network; obtaining a stack requirement for a protocol stack, wherein the stack requirement specifies at least a functionality for a stack component; selecting the stack component, based on the functionality and at least a name prefix of the interest or the object; and instantiating the stack component in the protocol stack.

20 Claims, 8 Drawing Sheets

(56) References Cited

U.S. PATENT DOCUMENTS

| | | |
|---|---|---|
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surduiescu |
| 7,535,926 B1 | 5/2009 | Deshpande et al. |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,239 B2 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardey |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |

(56) References Cited

U.S. PATENT DOCUMENTS

| | | |
|---|---|---|
| 9,280,610 B2 | 3/2016 | Gruber |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0238050 A1* | 10/2005 | Pung ............... H04L 69/22 370/469 |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123536 A1* | 5/2008 | Johnson ............... H04L 41/12 370/241 |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |

(56) References Cited

U.S. PATENT DOCUMENTS

| | | |
|---|---|---|
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Karnath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091539 A1 | 4/2013 | Khurana |
| 2013/0110987 A1 | 5/2013 | Kim |

(56) References Cited

U.S. PATENT DOCUMENTS

| | | |
|---|---|---|
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129690 A1* | 5/2014 | Jaisinghani ........... G06F 9/5061 709/222 |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0179738 A1 | 5/2014 | Yu |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0237095 A1 | 8/2014 | Bevilacqua-Linn |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0117253 A1* | 4/2015 | Scott ..................... H04L 45/306 370/254 |
| 2015/0120663 A1 | 4/2015 | LeScouarnec |
| 2015/0120924 A1* | 4/2015 | Scott ...................... H04L 69/22 709/225 |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0171184 A1 | 6/2016 | Solis |
| 2016/0205226 A1 | 7/2016 | Solis et al. |
| 2016/0352604 A1* | 12/2016 | Valencia Lopez ........................... H04L 67/2842 |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2214356 | 5/2016 |
| WO | 03005288 A2 | 1/2003 |
| WO | 03042254 A1 | 5/2003 |
| WO | 03049369 A2 | 6/2003 |

(56) References Cited

FOREIGN PATENT DOCUMENTS

| WO | 03091297 A1 | 11/2003 |
| WO | 2005041527 A1 | 5/2005 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2012077073 A1 | 6/2012 |
| WO | 2013123410 | 8/2013 |
| WO | 2015084327 | 6/2015 |

OTHER PUBLICATIONS

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.

Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.

Tiancheng Zhuang et al. "Managing Ad Hoc Networks of Smartphones", International Journal of Information and Education Technology, Oct. 1, 2013.

Amadeo et al. "Design and Analysis of a Transport-Level Solution for Content-Centric VANETs", University "Mediterranea" of Reggio Calabria, Jun. 15, 2013.

Marc Mosko "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].

Akash Baid et al: "Comparing alternative approaches for networking of named objects in the future Internet" Computer Communications Workshops (Infocom Wkshps), 2012 IEEE Conference on, IEEE, Mar. 25, 2012, pp. 298-303, *Paragraph [002]* *figure 1*.

Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], [0013]* * figures 1,2*.

Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.

Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.

Priya Mahadevan et al. "CCN-KRS", Proceedings of the 1st International Conference on Information-Centric Networking, Inc. '14, Sep. 24, 2014.

Flavio Roberto Santos Et al. "Funnel: Choking Polluters in BitTorrent File Sharing Communities", IEEE Transactions on Network and Service Management, IEEE vol. 8, No. 4, Dec. 1, 2011.

Liu Wai-Xi et al: "Multisource Dissemination in content-centric networking", 2013 Fourth International conference on the network of the future (NOF), IEEE, Oct. 23, 2013, pp. 1-5.

Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.

Asokan et al.: "Server-Supported Signatures", Computer Security Esorics 96, Sep. 25, 1996, pp. 131-143, Section 3.

Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.

Sun et al.: "Content-Based Route Lookup Using CAMs", Global Communications Conference, IEEE, Dec. 3, 2012 *The Whole Document*.

Jacobson, Van et al., "Content-Centric Networking, Whitepaper Describing Future Assurable Global Networks", Palo Alto Research Center, Inc., Jan. 30, 2007, pp. 1-9.

Koponen, Teemu et al., "A Data-Oriented (and Beyond) Network Architecture", SIGCOMM '07, Aug. 27-31, 2007, Kyoto, Japan, XP-002579021, p. 181-192.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (PURSUIT)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking (Feb. 2009).

B. Ahlgren et al., 'A Survey of Information-centric Networking' IEEE Commun. Magazine, Jul. 2012, pp. 26-36.

B. Lynn$2E.

Bari, MdFaizul, et al. 'A survey of naming and routing in information-centric networks.' Communications Magazine, IEEE 50.12 (2012): 44-53.

Baugher, Mark et al., "Self-Verifying Names for Read-Only Named Data", 2012 IEEE Conference on Computer Communications Workshops (INFOCOM WKSHPS), Mar. 2012, pp. 274-279.

Brambley, Michael, A novel, low-cost, reduced-sensor approach for providing smart remote monitoring and diagnostics for packaged air conditioners and heat pumps. Pacific Northwest National Laboratory, 2009.

C. Gentry and A. Silverberg. Hierarchical ID-Based Cryptography. Advances in Cryptology—ASIACRYPT 2002. Springer Berlin Heidelberg (2002).

C.A. Wood and E. Uzun, "Flexible end-to-end content security in CCN," in Proc. IEEE CCNC 2014, Las Vegas, CA, USA, Jan. 2014.

Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.

Cho, Jin-Hee, Ananthram Swami, and Ray Chen. "A survey on trust management for mobile ad hoc networks." Communications Surveys & Tutorials, IEEE 13.4 (2011): 562-583.

(56) References Cited

OTHER PUBLICATIONS

Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D. Boneh, C. Gentry, and B. Waters, Collusi.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam. Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A._J.M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh. S. K., Lin, Y., Tootoonchian, A., Ghodsi, A., Koponen, T., Maggs, B., & Shenker, S. (Aug. 2013). Less pain, most of the gain: Incrementally deployable ICN. In ACM SIGCOMM Computer Communication Review (vol. 43, No. 4 pp. 147-158). ACM.
G. Ateniese, K. Fu, M. Green, and S. Hohenberger. Improved Proxy Reencryption Schemes with Applications to Secure Distributed Storage. In the 12th Annual Network and Distributed System Security Sympo.
G. Tyson, S. Kaune, S. Miles, Y. El-Khatib, A. Mauthe, and A. Taweel, "A trace-driven analysis of caching in content-centric networks," In Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
H. Xiong, X. Zhang, W. Zhu, and D. Yao. CloudSeal: End-to$2.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 (2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM. 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Science vol. 5443 (2009).
V. Jacobson et al., 'Networking Named Content,' Proc. IEEE CoNEXT '09, Dec. 2009.
Jacobson, Van et al. 'VoCCN: Voice Over Content-Centric Networks.' Dec. 1, 2009. ACM ReArch'09.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.

(56) References Cited

OTHER PUBLICATIONS

M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for con," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
Rosenberg, J. "Interactive Connectivity Establishment (ICE): A Protocol for Network Address Translator (NAT) Traversal for Offer/Answer Protocols", Apr. 2010, pp. 1-117.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shih, Eugene et al., 'Wake on Wireless: An Event Driven Energy Saving Strategy for Battery Operated Devices', Sep. 23, 2002, pp. 160-171.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.

(56) References Cited

OTHER PUBLICATIONS

W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 (2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digital Rights Management using Broadcast Encryption. Proceedings of the IEEE 92.6 (2004).
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdl.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Summons to attend oral proceedings pursuant to Rule 115(1) EPC issued in counterpart European Application No. 16150270.3, mailed Nov. 30, 2017, 10 pgs.
Huard, et al., "A Programmable Transport Architecture With QoS Guarantees", IEEE Communication Magazine, IEEE Service Center, vol. 36, No. 10, Oct. 1998, 9 pgs.
Cheng, et al., "How to Make Network Nodes Adaptive?", IEEE Communications Letters, IEEE Service Center, vol. 18, No. 3, Mar. 2014, 4 pgs.
Gelenbe, et al., "Networks with cognitive packets", Modeling, Analysis and Simulation of Computer and Telecommunication Systems, 2000. Proceedings. 8th International Symposium on, IEEE, Aug. 29-Sep. 1, 2000, 8 pgs.
Gazis, et al., "On the Role of Semantic Descriptions for Adaptable Protocol Stacks in the Internet of Things", 2014 28th International Conference on Advanced Information Networking and Applications Workshops, IEEE, May 13, 2014, 7 pgs.
Anonymous: "Software maintenance—Wkipedia", Oct. 17, 2014, Retrieved from the Internet: https://en.wikipedia.org/w/index.php?titles=Software_maintenance&oldid=629937369, Jan. 30, 2017, 6 pgs.

* cited by examiner

AUTO-CONFIGURABLE TRANSPORT STACK

CROSS REFERENCE TO RELATED APPLICATION

This application is a continuation of U.S. Non-Provisional application Ser. No. 14/595,060, filed Jan. 12, 2015, now U.S. Pat. No. 9,832,291, which is incorporated herein by reference in its entirety.

BACKGROUND

Field

This disclosure is generally related to protocol stacks. More specifically, this disclosure is related to an auto-configurable transport stack which can automatically create and update a transport stack for an application based on a set of stack requirements.

Related Art

The ubiquitous nature of mobile computing devices and the Internet is making it possible for people to experience digital content from anywhere. People can use applications in their mobile computing devices to consume or interact with content from service providers across the Internet, such as to stream movies or music or to play games with others.

These advances in mobile computing are also increasing the quality of content that can be reproduced by these mobile devices and greatly increases the number of devices that can generate and capture digital content and share with others over the Internet. Nowadays, even small mobile devices such as smartphones can produce full high-definition video with high-quality color reproduction, and high-speed cellular and broadband networks make it possible for users to share this content with others over various Internet services, such as the YouTube (from Google, Inc.) and Facebook (from Facebook, Inc.) content-sharing services.

Many computer applications leverage these computer networks and Internet services to provide social features to its users, which greatly enhances the user experience. When an application wants to use the network, it does so by using one or more APIs that run on the computing device's operating system. These APIs provide a way for applications to send, receive, store, configure data or otherwise communicate with other computers across the network.

For example, an application first needs to instantiate a protocol stack that implements a network API before the application can use the API to send or receive data over the network. However, instantiating the API's protocol stack requires the application to explicitly instantiate and combine the protocol elements that implement the API's functionality that the application wishes to use. To make matters worse, if the protocols used by the computer network or a target server changes, the application will not be able to communicate with the target server, thereby hindering its use. The application's developer will need to rewrite and recompile the application using code that can construct the modified protocol stack for the new API.

SUMMARY

One embodiment provides a transport-framework system that facilitates instantiating a custom transport stack. During operation, the system can obtain a stack requirement for a custom stack. The stack requirement specifies at least component attributes for one or more components to instantiate in the custom stack. The system selects a stack component that satisfies the stack requirement for the custom stack, and instantiates the stack component in the custom stack. The system can select a stack component, for example, by analyzing the stack requirement to determine a component requirement for a component that needs to be instantiated in the custom stack. The system determines, from a component repository, a set of matching components that satisfies the component requirement. If multiple matching components exist, the system selects a matching component which is most compatible with other components in the custom stack.

In some embodiments, the transport framework operates under the information centric networking (ICN) architecture. In ICN, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. Named-data network (NDN) or a content-centric network (CCN) are examples of ICN architecture; the following terms describe elements of an NDN or CCN architecture:

Content Object: A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

In some embodiments, the ICN system can include a content-centric networking (CCN) architecture. However, the methods disclosed herein are also applicable to other ICN architectures as well. A description of a CCN architecture is described in U.S. patent application Ser. No. 12/338, 175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

In some embodiments, while obtaining the stack requirement, the system can obtain the stack requirement from a transport library component, from a transport application programming interface (API) component, from a network packet, and/or from a component in the custom stack.

In some embodiments, the system can obtain the stack component from a local repository.

In some embodiments, the system can search for the stack component in a local repository. If the system determines that the stack component is not available in the local repository, the system can obtain the stack component from a remote repository.

In some embodiments, the remote repository includes a component cache, a component storage server, and/or a component marketplace.

In some embodiments, the system can determine whether an updated version of the stack component exists. If an updated version exists, the system can determine a stack in which the stack component is instantiated, and replaces the instantiation of the stack component with an instantiation of the updated version of the stack component.

In some variations to these embodiments, the system can analyze the updated version of the stack component to obtain a stack requirement. If the system determines that the stack requirement of the stack component has changed, the system can update the stack's implementation to satisfy the new stack requirement.

BRIEF DESCRIPTION OF THE FIGURES

In the figures, like reference numerals refer to the same figure elements.

DETAILED DESCRIPTION

Figure 1:
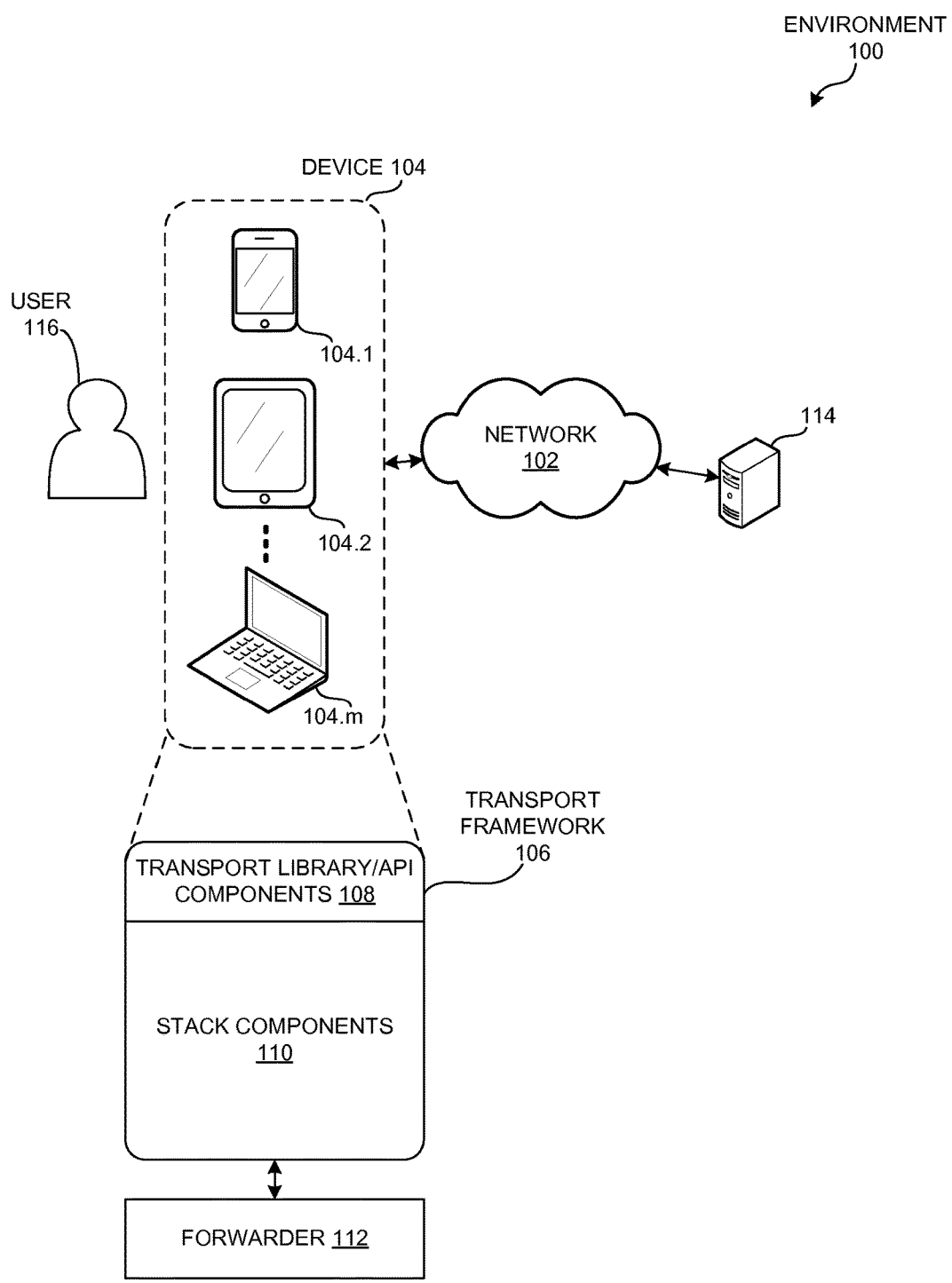
FIG. 1 illustrates an exemplary environment which facilitates auto-configuring a stack in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a transport framework which solves the problem of auto-configuring a transport stack. For example, the transport framework can create transport stacks to suit the needs of various Application Programming Interfaces (APIs) used by applications to access a local resource, such as to communicate over a network. The transport framework provides a set of components that can be combined into a transport "stack" that achieves an API's functionality.

An API can use the transport framework by requesting the transport framework to create a transport stack that satisfies the API's stack requirements. The stack requirements can specify a set of attributes for one or more components that are to be instantiated in a stack, and can specify a policy under which the stack components are to operate. A very basic transport stack might include a component that interfaces with the API and a component that interfaces with the network. These stack components provide the ingress and egress pathways for the transport stack, and are hereinafter referred to as "connectors." The API connector communicates with the local API, and the network connector communicates to other devices over the network.

Each of the components within a transport stack performs a specific function, and some components can implement a functionality that is more specific or more generic than other versions of the same component. Some components may take parameters at load time that define their behavior, and some components may be configured at run-time based on parameters that they receive from a local application or from a device over the network. For example, some components may adapt to changing operating environment conditions or network conditions over time. The transport framework provides a way for configuration messages and information to be sent between the components and the APIs, for example, to allow components within a stack to communicate with each other.

An application can communicate over the network by issuing a "call" to the API, which causes the API to construct a message. This message will flow through the appropriate transport stack, visiting various components as the message makes its way to the network. Each component uses load-time and/or run-time configuration information to perform specific actions on the message, which can include modifying the message, terminating/deleting the message, and/or creating new messages.

In some embodiments, the transport framework can include a transport-framework agent which dynamically configures and/or reconfigures software stacks (e.g., at runtime) to accommodate changes in a local operating environment, changes in a network environment, or even changes within the transport framework. For example, the transport framework can include a repository comprising a set of available stack "components." Whenever a running application issues a call to a TCP/IP API component, the transport framework agent (hereinafter referred to simply as the "transport framework") can forward the call to a stack which has been instantiated for TCP/IP messages. If such a stack does not exist, the transport framework can instantiate a custom stack by combining a set of stack components in a way that satisfies the stack requirements in the application's API call.

Moreover, if the running application issues a call to the transport framework that requires new stack components to be instantiated, the transport framework can automatically download the required components at runtime, and instantiates the required components in the application's stack. The transport framework can also automatically download and instantiate any components it needs to use to process a packet received over the network (e.g., via the local forwarder).

In some embodiments, each component version may have an associated unique identifier that identifies the component and its version (e.g., a unique name and version number, or a globally unique alphanumeric identifier). Also, each component version may have an associated set of component attributes that identify a set of functionality implemented by the component, a set of component characteristics, and a set of roles which the component can serve. These component attributes can correspond to generic attribute classifications and/or specific attribute classifications. For example, a component can be associated with the generic "video encode" or "video decode" function attributes specifying that the component can encode or decode video streams, and can include specific function attributes for each codec that it supports. The transport framework can select a component to satisfy a stack requirement by selecting a component whose component attributes satisfy the component attributes of the stack requirement.

For example, a component associated with the generic "security" functionality features can also have an association with other specific features such as encryption, decryption, authentication, data signing, signature verification, trust assessment, filtering, etc. A component associated with the generic "data-processing" functionality feature can also have an association with other specific features such as encoding, decoding, encapsulating, decapsulating, transcoding, compression, extraction (decompression), etc. A component associated with the generic "storage" functionality feature can also have an association with other specific features such as data storage, data retrieval from storage, deduplication, segmentation, versioning, etc.

A component associated with the generic "data-transfer" functionality feature can also have an association with other specific features such as flow control, in-order delivery, retransmissions, packet rewriting, etc. A component associated with the generic "external services" functionality feature can also have an association with other specific features such as external-service discovery, external-service access, data search, data indexing, component search, etc.

Moreover, each component can include a policy, as well as stack requirements for other components that need to be instantiated in its stack. Some stack requirements can specify one or more components that need to be instantiated in the same stack when the local component is instantiated. Other stack requirements can specify one or more other components that need to be instantiated on-the-fly under certain network conditions (e.g., when the stack receives a compressed packet).

It may be possible that a newer version of a stack component may become available after the component has been instantiated in a stack. When a new version of a component becomes available, the transport framework can download the updated version of the component, and replaces any instantiation of the old component version with an instantiation of the new component version. If an instance of the new component version includes an updated stack requirement, the transport framework can process the new component's stack requirements to download and instantiate any other required components that have not yet been instantiated in the component's stack.

FIG. 1 illustrates an exemplary environment 100 which facilitates auto-configuring a stack in accordance with an embodiment. Computing environment 100 can include a computer network 102, such as a content centric network (CCN). Environment 100 can also include a user 116, a local computing device 104 and a remote computing device 114 whose internal transport stacks can exchange network packets with each other over network 102.

In the traditional IP architecture, forwarder 112 is an IP-based forwarder that looks at a packet's header to determine the source and the destination for the packet, and forwards the packet to the destination. The stack performs TCP/UDP, and an application interacts with the stack via a socket. In contrast, device 104 of the present invention doesn't use a conventional "stack." Rather, device 104 implements a "transport framework" 106 which can dynamically configure a custom stack to satisfy an application's custom "environment execution context."

Device 104 can include any computing device coupled to network 102, such as a smartphone 104.1, a tablet computer 104.2, and/or a server or personal computer 104.$m$. Specifically, device 104 can include a transport framework 106 which can automatically create and/or update a custom stack for a local application or the local operating environment (e.g., without intervention of a local user 116, the local operating environment, and/or any applications running on device 104). Device 104 can also include a forwarder 112 (e.g., a network interface card, or a router in a local area network), which can transfer packets between custom stacks of transport framework 106 and network 102. The custom stack can be to and/or from forwarder 112 or any application running on device 104, and the stack's components can include any available components that can be organized in any order to satisfy the application's requirements.

In some embodiments, transport framework 106 can include a set of stack-configuring agents that can dynamically configure a stack on-demand. For example, transport framework 106 can include a set of transport library/API components 108 that implement functions accessible via a library and/or an API. An application can access a library or an API implemented by transport framework 106 by issuing a call to transport framework 106. Transport framework then maps the library or API call to a corresponding library/API component of components 108 that implements this specific function, and forwards the library or API call to this library/API component.

The library/API component then configures or instantiates a custom stack that can perform the application's library/API call. For example, the library/API component can issue a request to transport framework 106, with a request describing the functionality of the custom stack. This functionality description can be high-level, such as to specify a predefined behavior or operation that is to be performed on data packets. Transport framework 106 then realizes this behavior or operation by organizing the necessary components into a custom stack (e.g., in stack components 110) in an order that achieves the desired behavior or operation.

Alternatively, the functionality description can be low-level, such as to specify the specific stack components that are to be used, and can specify an order in which the stack components are to be arranged. Moreover, the functionality description can also be specific or generic with respect to the individual components, for example, to request a specific "flow controller" (e.g., a TCP flow controller) or to request any "flow controller." As another example, a specific component description may specify an encryption component that implements a specific encryption algorithm, whereas a general component description or may specify that any available "encryption" component may be used.

In some embodiments, a stack in device 104 can interact with a stack in device 114, for example, to implement an end-to-end solution. Also, an application can require a different environment execution context from a stack, which transport framework 106 configures the stack to satisfy. For example, an application running on device 104 can require a stack to deliver packets in-order to a stack on device 114, to perform re-transmissions of dropped or lost packets, to verify received packets, etc.

In some embodiments, transport framework 106 can create a custom stack comprising application-specific components, such as a flow controller component, an "encoding" and/or "decoding" component, and any other component that packages data into network packets and/or processes network packets for the application. The flow controller can control the number of packets that reach the forwarder, or that are received by the forwarder for the application, in which order, the number of outstanding Interests, etc. The "encoding" component can transform the application's data (e.g., from the application's own data structure) into a "wire" format (e.g., a network packet) that forwarder 112 can use to directly transmit over network 102.

Transport framework 106 can also create a custom stack that processes Internet Protocol (IP) packets for the local application. Unlike traditional TCP/IP, transport framework 106 can create the custom stack to include a "security" related component. This security component can be used to sign data, to perform verification on a signature for a piece of data, for encrypting or decrypting data, etc.

Figure 2:
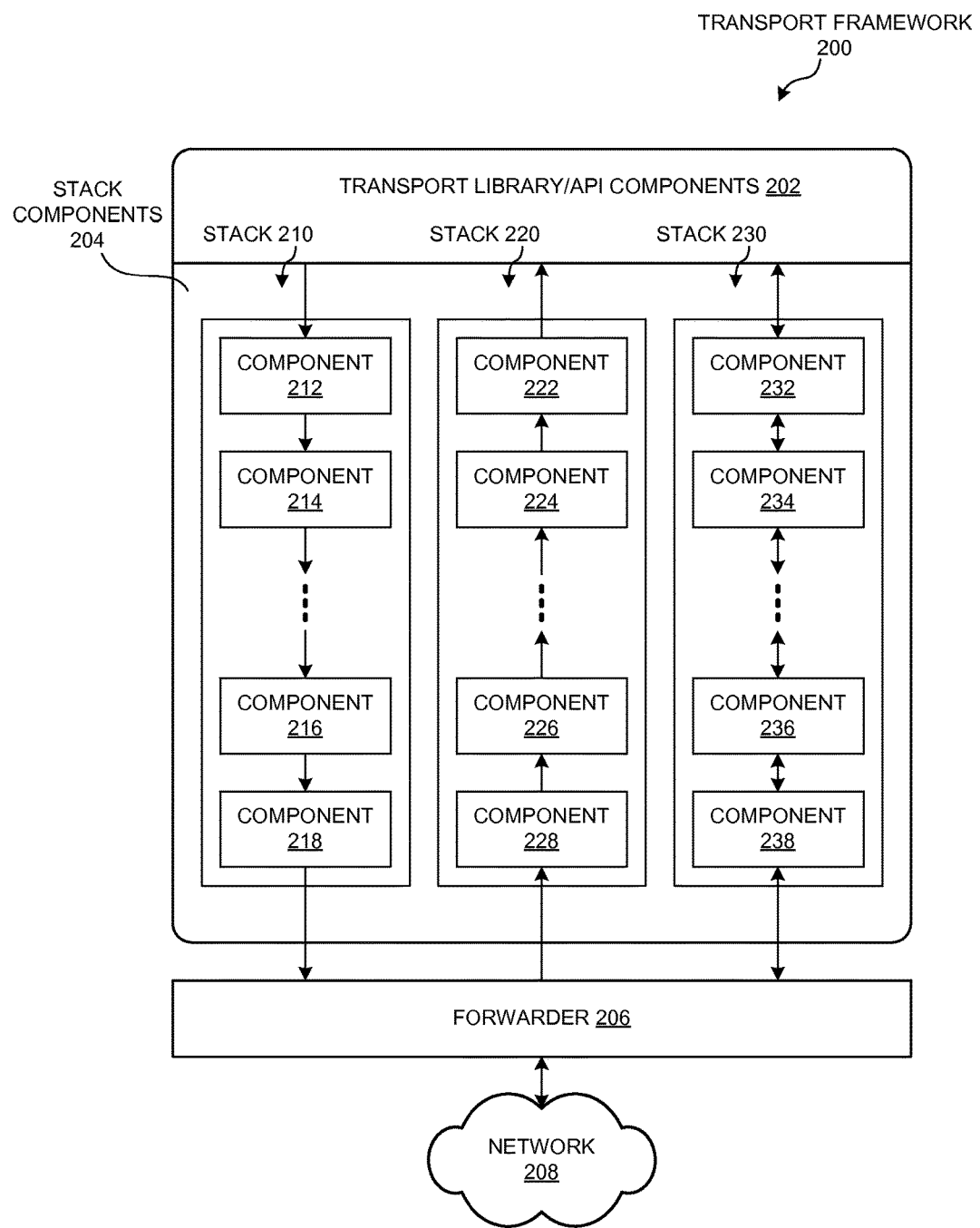
FIG. 2 illustrates an exemplary transport framework in accordance with an embodiment.

FIG. 2 illustrates an exemplary transport framework 200 in accordance with an embodiment. An application can dynamically configure transport framework 200 to satisfy the application's "environment execution context." The transport framework is internally made up of components that can be combined to form a custom "stack" (e.g., the stack is "composable"). Specifically, transport framework 200 includes transport library/API components 202 that interface with an application or operating environment, and includes a set of stack components 204 that can be combined into a set of stacks (e.g., stacks 210, 220, and 230) that implement a functionality desired by the application.

In some embodiments, library/API components 202 may be implemented using components of transport framework 200, and each of library/API components 202 can correspond to a feature available to local applications and the operating environment (e.g., a function). This allows transport framework 200 to automatically and dynamically update the set of libraries and API features that are available for applications and the operating environment. Moreover, a library/API component can itself include a policy and a set of stack requirements. Transport framework 200 uses the component's policy and stack requirements to instantiate a stack that realizes the functionality of the library/API component.

The stacks in transport framework 200 can interface with a forwarder 206, which behaves as a multiplexer/demultiplexer to forward packets to and/or from a stack, an application, or a network interface. Forwarder 206 can use a set of rules specifying which packets can go in each direction. Also, forwarder 206 doesn't need to modify packets; rather, forwarder 206 controls how packets flow in and out of the stacks of transport framework 200. For example, forwarder 206 can forward packets from one interface to another interface, from one application to another application, from an application to an interface, or from an interface to an application. In some embodiments, forwarder 206 can include a logical interface, a physical interface, or a router in a local area network.

In some embodiments, an application or operating environment can interface with library/API components 202, but does not interface directly with stacks of transport framework 200 (e.g., stack components 204 forming stacks 210, 220, and 230). Also, a stack can reside between library/API components 202 and forwarder 206. The stack's components do the custom work for an application for which the stack was instantiated.

The stack can be to/from forwarder 206 or any application, and the stack's components can include any available components that can be organized in any order. For example, one set of components 212-218 can be organized into a stack 210 that processes a flow of packets from the application to forwarder 206, another set of components 222-228 can be organized into a stack 220 that processes another flow of packets from the forwarder to the application.

In some embodiments, a set of components 232-238 can be organized into a full-duplex stack 230 that can process packets between the application and the forwarder in either direction (not shown). Moreover, components can also be organized into an inter-application stack that processes a flow of packets between applications, or into a "relay" stack that processes a flow of packets on behalf of the forwarder (e.g., security or firewall related operations).

In some embodiments, the components can originate from outside transport framework 200. For example, a library/API component can provide to transport framework 200 a component which the library/API component needs to instantiate in a stack. Alternatively, if the library/API component requests to use a stack which includes a component missing in transport framework 200, it is possible for transport framework 200 to request this component from a remote system. Transport framework 200 can import a component from another service, from a remote computer, from a transport framework on a remote computer, etc.

In some embodiments, transport framework 200 can access a component from a local component repository, and instantiates the component in each stack that needs to use the component. If a component is not available in the local component repository, transport framework 200 can access the component from a remote system (e.g., a server that hosts a component repository), and/or can purchase the component from a component marketplace. The component marketplace can include a store for purchasing transport framework components, running on a remote system.

Hence, transport framework 200 can start with a component repository that includes a fundamental set of stack components. These fundamental set of components can be limited to library/API components 202 that implement a set of fundamental library or API features. Then, over time, as the user installs applications that require certain transport stacks or additional features from the operating environment, transport framework 200 can download and install additional components which are relevant to the user's applications. This effectively customizes transport framework 200 to the user's desired functionality, and to the types of applications which the user runs.

Transport framework 200 does not need to pre-install any stack components which the user's applications do not need. Also, neither the user nor his applications need to explicitly install any necessary stack components themselves. Hence, transport framework 200 automatically (e.g., without user or application intervention) retrieves and installs the components it needs.

In some embodiments, transport framework 200 can uphold a "policy" which dictates whether and/or how transport framework 200 can purchase components. This policy can specify which types of paid components can be purchased on behalf of the user, a certain purchase limit for the user, and/or a process for purchasing these components. For example, this policy can require an application or the operating system to obtain approval from the user for purchasing (or downloading) a component prior to purchasing (or downloading) the component on behalf of the user. On the other hand, if the user has granted a local application or a remote service permission to install any free (and/or any for-fee components), transport framework 200 may proceed to install these types of components when requested by the application and/or the remote service.

Auto-Configuring a Stack for a Local User or Application

In some embodiments, transport framework 200 can automatically (e.g., without user or application intervention) configure a stack based on transport requirements from a local application or a remote transport framework. Also, transport framework 200 can load components depending on requirements from an operating environment, such as from the computer's operating system. If a stack exists that satisfies the transport requirements, transport framework 200 can use this existing stack. However, if such a stack does not exist at the time, transport framework 200 automatically instantiates the stack (and stack components) that can satisfy the transport requirements.

For example, an application may request a stack that achieves "reliable delivery," and transport framework 200 can query the local component repository, a remote component repository, or a component marketplace to obtain a component which achieves the application's requirement of delivering packets reliably. Once transport framework 200 obtains the necessary components, transport framework 200 automatically instantiates a custom stack for the application that includes the required component.

In some embodiments, transport framework 200 may customize which components are loaded based on the user associated with the running application. For example, when a system administrator is logged onto the computer, transport framework 200 may load a version of a flow-control component that logs traffic statistics for the system administrator. This allows the system administrator to inspect an application's traffic, behavior, or performance. On the other hand, when an ordinary user is logged into the computer, transport framework 200 may load a simple flow controller that achieves the application's basic requirements.

As a further example, if the user is not a system administrator, transport framework 200 may load additional components that it would not load for a system administrator, such as a component that monitors or manages (e.g., limits or restricts) the user's traffic, behavior, or resource requirements. Transport framework 200 may load components that restrict the user's traffic to within a predetermined quota (e.g., a bandwidth quota), and/or that implement a firewall (e.g., to control the types of network traffic or content that the user can access).

Figure 3:
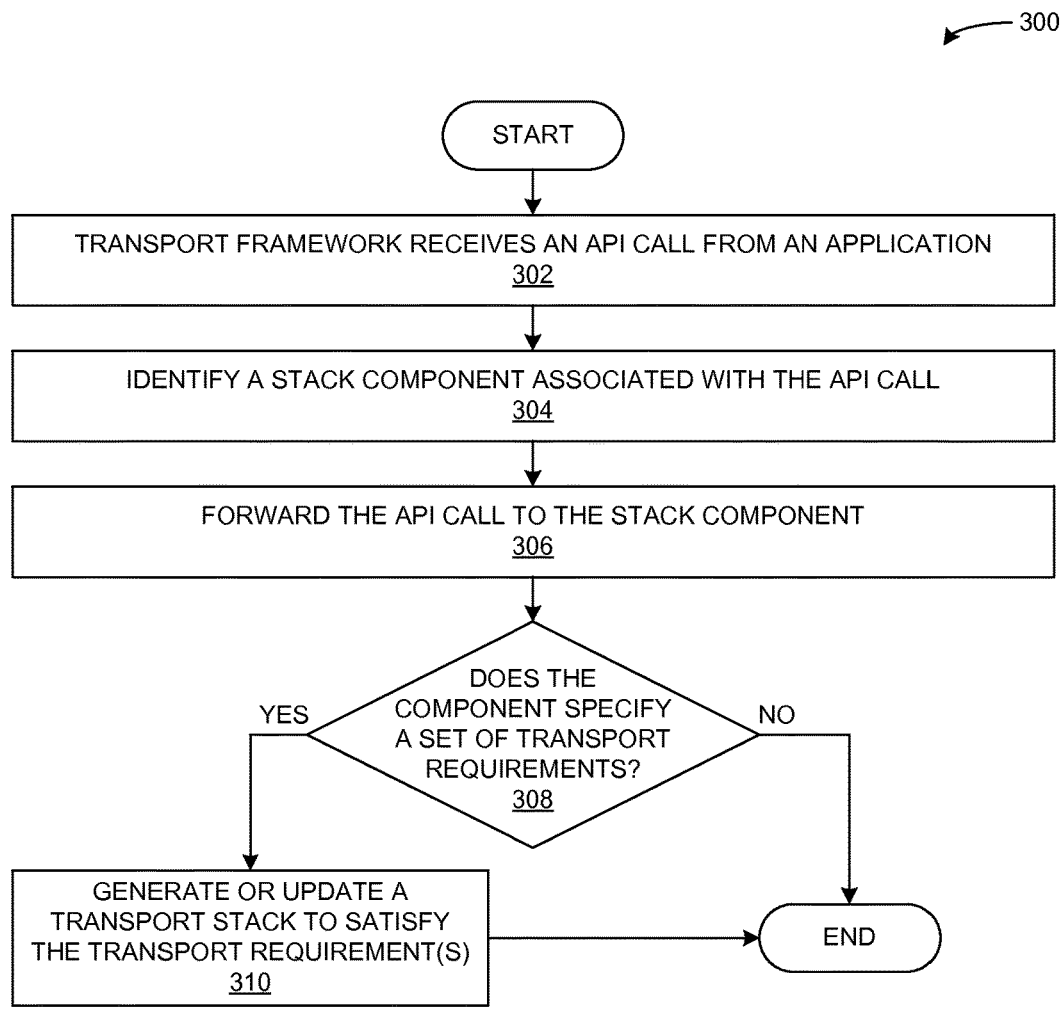
FIG. 3 presents a flow chart illustrating a method for auto-configuring a stack for an application in accordance with an embodiment.

FIG. 3 presents a flow chart illustrating a method 300 for auto-configuring a stack for an application in accordance with an embodiment. Specifically, the system can receive a call from an application via a transport library or API (operation 302). In some embodiments, the library or API is implemented via a set of transport components, such that each component implements a function accessible via the library or API. The system can add additional functionality to the library or API by instantiating additional components that implement this functionality. After receiving the function call, the system can identify a stack component associated with the function call (operation 304), and forwards the function call to this stack component (operation 306).

In some embodiments, the stack component for the library or API function call can include a set of transport requirements which specify a description for a stack necessary for performing the given operation. The transport requirement can include a policy, a set of components, and an ordering in which the set of components need to be arranged into a stack. Hence, the system determines whether the library or API's stack component specifies a set of transport requirements (operation 308). If so, the system generates or updates a transport stack to satisfy the set of transport requirements (operation 310).

Auto-Configuring a Stack for a Remote System or Service

The transport framework can load certain components, or offer certain components, based on the identity of the sender or the receiver (e.g., a local application or an application on a remote computer). For example, a remote video-streaming service may pre-process its data using a custom compression and/or encryption algorithm before transfer, and may host a custom transport component that can decompress and/or decrypt the service's packets for the client application. Hence, while the local computer is initiating a session with the remote video-streaming service, the remote service may offer this custom component to the client application as a requirement to initialize the streaming session. If the client computer rejects the custom component (e.g., due to the current user's limited permissions), the remote video-streaming service may reject the request to set up the streaming session. On the other hand, if the client computer's transport framework accepts the video-streaming service's custom component and loads this component in a stack, the remote video-streaming service may proceed to stream the compressed and/or encrypted stream to the client application.

Thus, a local application can communicate with the remote service without knowing the remote service's transport requirements, and without the application having to specify the remote service's transport requirements to the local transport framework. This allows the remote service to change its transport requirements at any time without requiring the user to install an updated version of the application. If the remote service changes its transport requirements, the remote service informs the local transport framework of these transport requirements. If the local transport framework is missing a necessary component for a new or updated transport requirement, the local transport framework may obtain this component from the remote service (e.g., if the remote service has offered the custom component), or may request the component from a predetermined component repository or marketplace.

Figure 4:
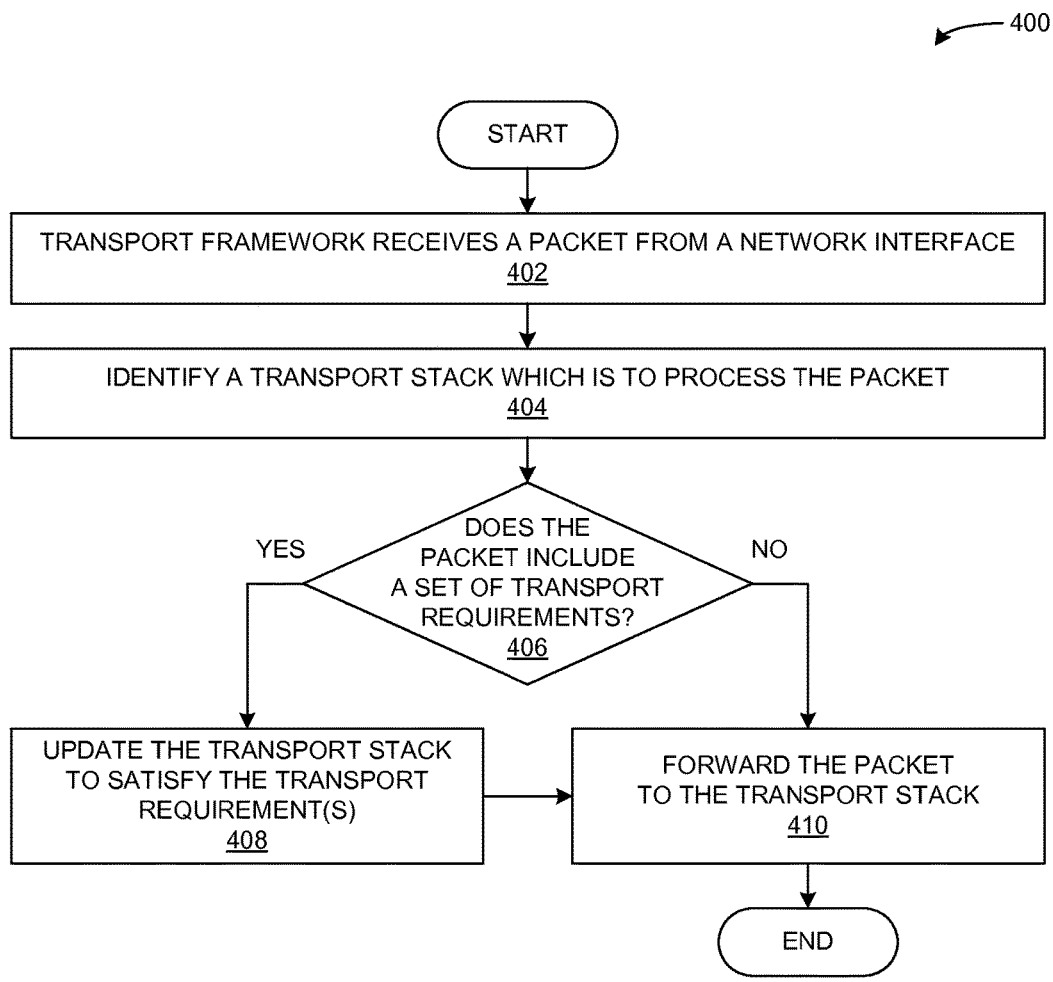
FIG. 4 presents a flow chart illustrating a method for updating a transport stack to satisfy a requirement from a remote device in accordance with an embodiment.

FIG. 4 presents a flow chart illustrating a method 400 for processing an incoming packet in a transport stack in accordance with an embodiment. During operation, the system can receive a packet from a network interface (operation 402), and identifies a transport stack which is to process the packet (operation 404). The system can also determine whether the packet includes a set of transport requirements (operation 406). If so, the system updates the transport stack to satisfy the set of transport requirements (operation 408).

Auto-Updating Stack Components

In some embodiments, a developer of a stack component can update the stack component to add new features, to correct security issues, or to correct implementation errors. When a new version of a stack component becomes available, the transport framework can download the updated version of the component, and replaces any instantiation of the old component version in a stack with an instantiation of the new component version.

Figure 5:
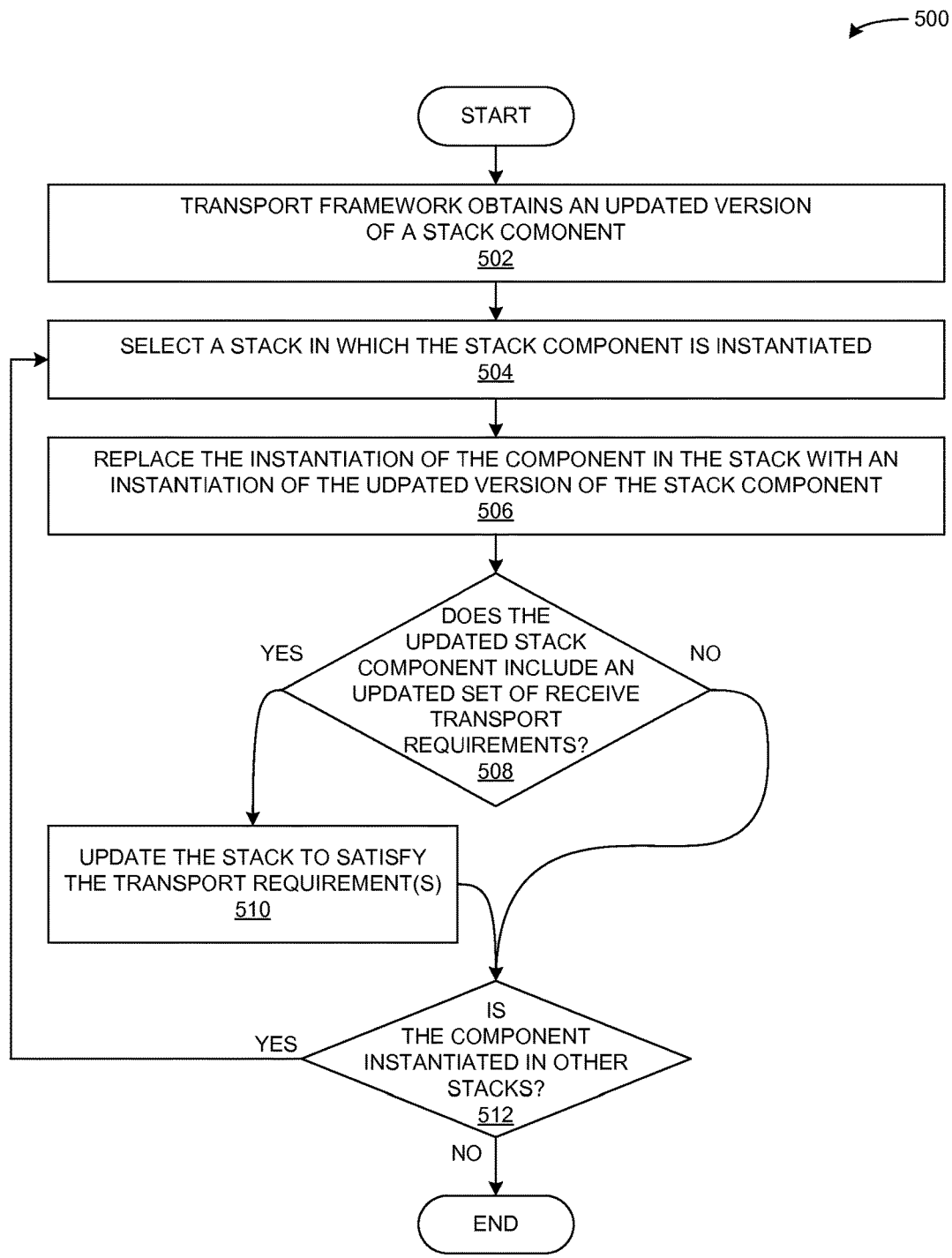
FIG. 5 presents a flow chart illustrating a method for updating one or more stacks upon receiving an updated version of a stack component in accordance with an embodiment.

FIG. 5 presents a flow chart illustrating a method 500 for updating one or more stacks to include an updated version of a stack component in accordance with an embodiment. During operation, the system can obtain an updated version of a stack component (operation 502). For example, the transport framework can include a local content repository of available components, and the system can periodically query a remote component repository or marketplace for updates to the local components. If an update exists for a component, the system proceeds to download the updated version of the component, and stores the updated version in the local content repository.

If the system receives an updated version of a component, the system selects a stack in which the stack component is instantiated (operation 504), and replaces the instantiation of the component in the stack with an instantiation of the updated version of the stack component (operation 506). It's possible for the new component version to include an updated stack requirement, which the transport framework can process to download and instantiate any other required components that have not yet been instantiated in the current stack. The system determines whether the updated stack component includes an updated set of transport requirements (operation 508). If so, the system updates the stack to satisfy the component's updated transport requirements (operation 510).

The system then determines whether the component is instantiated in other stacks (operation 512). If so, the system can return to operation 504 to select another stack to update based on the updated version of the stack component.

Satisfying Transport Requirements

Figure 6:
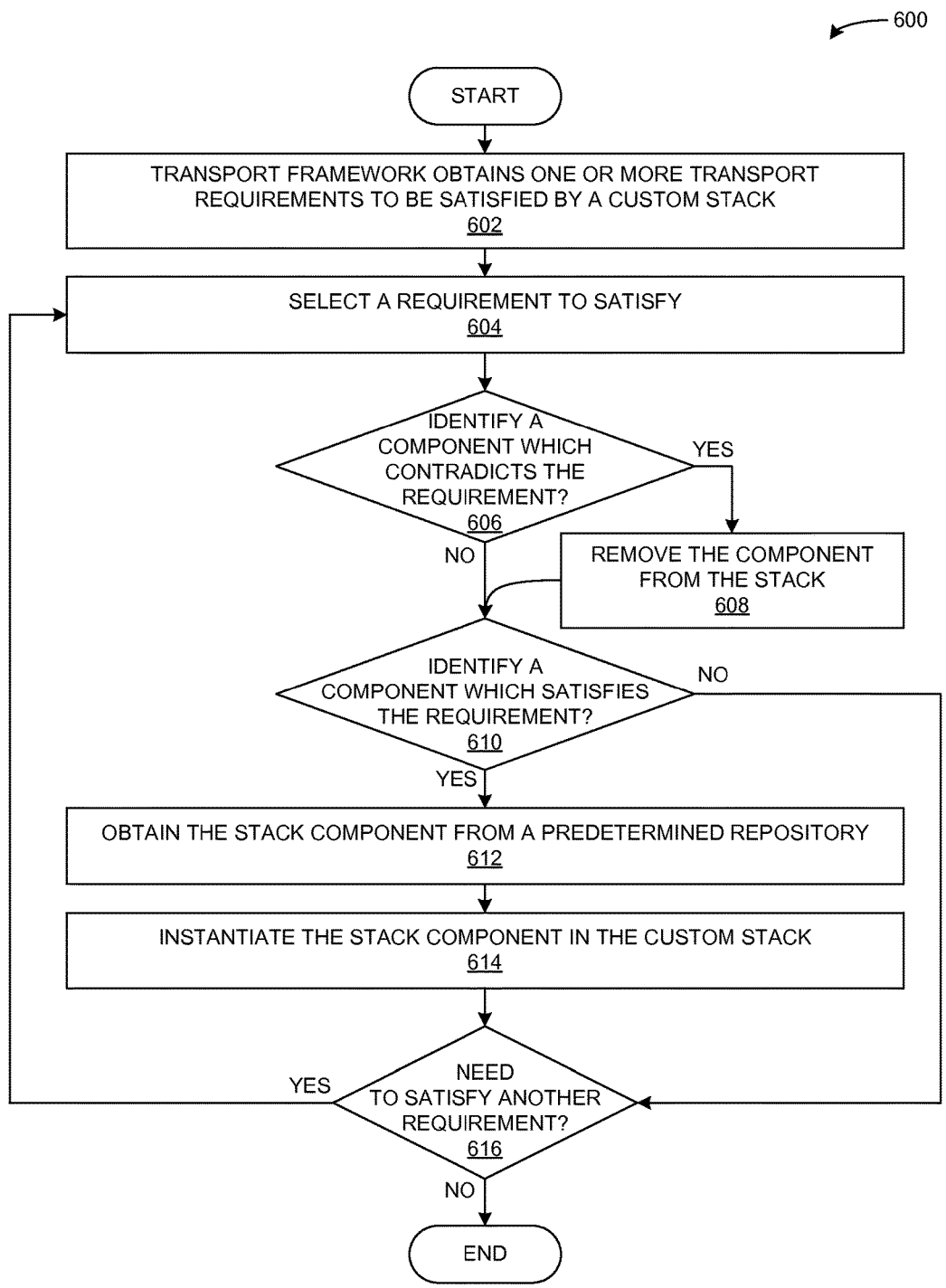
FIG. 6 presents a flow chart illustrating a method for auto-configuring a stack to satisfy a set of transport requirements in accordance with an embodiment.

FIG. 6 presents a flow chart illustrating a method 600 for auto-configuring a stack to satisfy a set of transport requirements in accordance with an embodiment. During operation, the system obtains one or more transport requirements to be satisfied by a custom stack of the transport framework (operation 602). These transport requirements can originate from an application, an operating environment, from a remote device, or from a stack component. The system can process the set of transport requirements by selecting a requirement to satisfy (operation 604).

The system can determine whether component violates the selected requirement (operation 606), and if so, proceeds to remove the component from the stack (operation 608). The system can also determine whether a component in a predetermined component repository can be used to satisfy the requirement (operation 610). If so, the system obtains the stack component from the repository (operation 612), and instantiates the component in the custom stack (operation 614).

Once the system has satisfied the transport requirement, the system can determine whether there exists other transport requirement that need to be satisfied (operation 616). If so, the system returns to operation 604 to satisfy another transport requirement.

Auto-Configuring a Stack for CCN Objects

When operating in a Content Centric Network (CCN), the transport framework may load a component based on an Interest's name or name prefix, and/or based on a Content Object's name or name prefix. If the transport framework receives an Interest for a given name prefix, the transport framework can determine how to construct a stack for processing the Interest based on the Interest's name or name prefix. Similarly, the transport framework can use a Content Object's name or name prefix to determine how to construct a stack for processing the Content Object. For example, if a local application is disseminating an Interest to a video-streaming service's name prefix (e.g., a name prefix "/netflix" for the video streaming service from Netflix, Inc. of Los Gatos, Calif.), the transport framework may query a transport-configuration database to determine which transport components need to be instantiated for the name prefix. The transport framework can also query the transport-configuration database to determine from where these components can be downloaded (if they are not available locally), and how these components need to be combined to implement a custom stack for the name prefix.

In some embodiments, when a local application disseminates an Interest for a certain name prefix, the network (e.g., a gateway server from the Internet Service Provider (ISP), or a content server associated with the name prefix) may return a control packet which configures how the computer can receive packets from this name prefix. For example, the transport framework may receive a control packet which specifies a maximum rate at which the forwarder can disseminate Interests for this name prefix. The transport framework may forward this control packet to a flow controller component for the application's data-transmission stack (e.g., for transmitting Interests), which allows the flow controller to configure its settings to abide by the ISP's flow control requirements. Hence, the transport framework can auto-configure a stack according to external requirements received from the computer network, such as from a network provider or from a content producer.

Auto-Configuring a Stack for Network Elements in a Path

In existing systems, a remote entity may at most specify an encoding or encryption scheme that was used to generate a data stream. However, this requires that the local application to already have a pre-installed decoder or decryption component that corresponds to the stream's encoding or encryption scheme. If the local application does not have this component pre-installed, the application would not be able to process the stream from the remote entity.

In some embodiments, network elements in a path between the local transport framework and a remote transport framework may require the local transport framework to install a component. For example, a forwarder of the local computer or of the remote computer may require the local transport framework to install a component, such as a security-related component or a flow-control component. As another example, a router of the local network or an ISP, or a gateway of the ISP may send a packet to the local transport framework which specifies a stack configuration for the current application, or for any application. This stack configuration may specify a component to instantiate for a stack, and may specify an ordering in the stack for this component. The local transport framework may access a policy (e.g., for the local user, for the application, or for the operating environment) to determine whether the transport framework is allowed to instantiate the component in a stack for the user, the application, or the operating environment. The transport framework can install the component automatically, without an intervention from the user, the application, or the operating environment.

This external entity may enforce this requirement, and may refuse to process packets from the local transport framework if the packet is not formatted properly (e.g., signed) by the required component. The local transport framework can access this required component from a local content repository, or from a content repository or content marketplace hosted on a remote server. In some embodiments, the local transport framework may obtain the required component from the entity which imposed the requirement for this component.

Auto-Configuring a Stack for a Detected Network Service

In some embodiments, the transport framework may detect that there's a service on the network available to the transport framework (or may be informed about the service by a node along the network, such as a router). For example, one of these services may be a cache that caches packets or data which have been received by the local device or other network devices (e.g., a peer device on the same network). The local transport framework can access the caching service to access data requested by an application or the operating environment, without requiring the application or operating environment to specify that the transport framework can access the data from this specific cache. In fact, the local applications and/or operating environment do not need to be aware of the available services; the transport framework an automatically configure itself to use a service on behalf of the local applications and operating environment upon detecting the service.

For example, upon detecting a service, the transport framework may determine which stack requirements are associated with the available service. It is possible that the system may have instantiated a component that satisfies these stack requirements, but that does not make use of the available service. Hence, upon detecting a compatible stack requirement, the transport framework may instantiate a version of the required component that can make use of the available service.

In some embodiments, the transport framework may load components based on features supported by the network elements along the local network. For example, a next-hop neighbor may request the packets it receives to be compressed. In response of detecting this feature of the next-hop neighbor (or of another node in the network), the transport framework can load a compression component that compressed data prior to generating the packets that are to be transmitted over the network wire.

In some embodiments, a stack requirement may specify a component blacklist or parameter blacklist The component blacklist may specify one or more components that the transport framework is forbidden to load. Similarly, the parameter blacklist can specify one or more parameters that a certain component is forbidden to use. A forbidden parameter may be specific to a certain component or type of component (e.g., a bandwidth cap for a flow controller), or may be general and applicable to all instantiated components.

Auto-Configuring a Stack at Boot Time

In some embodiments, when a computing device boots, a transport framework of the computing device configures a stack for the local operating environment (e.g., the operating system). The transport framework can receive parameters from a router of the local network which configures how the transport framework creates a stack for the operating environment. These configuration parameters can include a set of components that need to be instantiated in the stack, and can include a description of how these components are ordered in the stack, policies that these components need to follow, and/or parameters for one or more of these components. The configuration parameters can also include other configuration information, such as CCN network information for the local interface (e.g., a CCN name prefix for the local interface), an Internet Protocol (IP) address for the local interface or service, a gateway IP address, etc.

Figure 7:
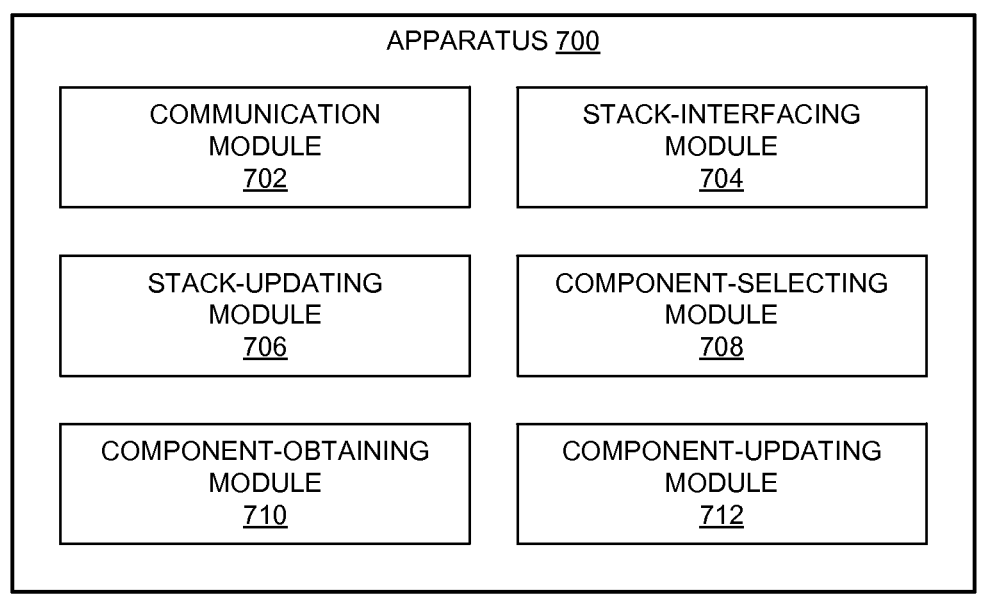
FIG. 7 illustrates an exemplary apparatus that facilitates auto-configuring a stack in accordance with an embodiment.

FIG. 7 illustrates an exemplary apparatus 700 that facilitates auto-configuring a stack in accordance with an embodiment. Apparatus 700 can comprise a plurality of modules which may communicate with one another via a wired or wireless communication channel. Apparatus 700 may be realized using one or more integrated circuits, and may include fewer or more modules than those shown in FIG. 7. Further, apparatus 700 may be integrated in a computer system, or realized as a separate device which is capable of communicating with other computer systems and/or devices. Specifically, apparatus 700 can comprise a communication module 702, a stack-interfacing module 704, a stack-updating module 706, a component-selecting module 708, a component-obtaining module 710, and a component-updating module 712.

In some embodiments, communication module 702 can send and/or receive data packets to/from other network nodes across a computer network, such as a content centric network. Stack-interfacing module 704 can process API calls from an application using a corresponding transport stack, and can process a network packet received over a computer network using a corresponding transport stack. Stack-updating module 706 can create and/or update a transport stack based on stack requirements received from an application, a data packet, or a stack component.

Component-selecting module 708 can select a stack component that satisfies a stack requirement, for example, from a local component repository, a remote component repository, or a component marketplace. Component-obtaining module 710 can obtain a component from the local repository, the remote repository, the component marketplace, or a network packet from a remote network device. Component-updating module 712 can detect when a newer version of a component becomes available, and updates the component in a stack with the newer version of the component.

Figure 8:
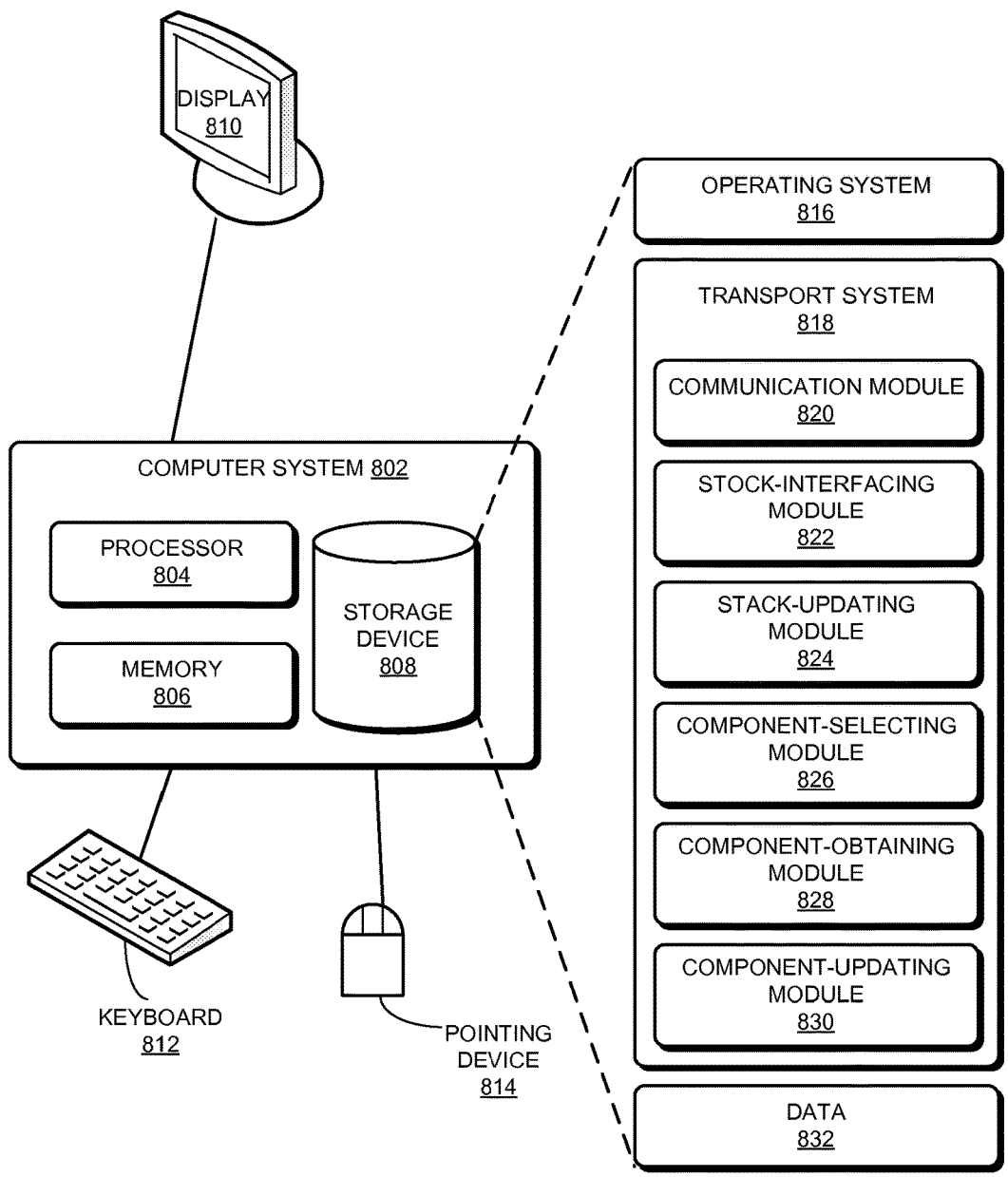
FIG. 8 illustrates an exemplary computer system that facilitates auto-configuring a stack in accordance with an embodiment.

FIG. 8 illustrates an exemplary computer system 802 that facilitates auto-configuring a stack in accordance with an embodiment. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store operating system 816, transport system 818, and data 832.

Transport system 818 can include instructions, which when executed by computer system 802, can cause computer system 802 to perform methods and/or processes described in this disclosure. Specifically, transport system 818 may include instructions for sending and/or receiving data packets to/from other network nodes across a computer network, such as a content centric network (communication module 820). Further, transport system 818 can include instructions for processing API calls from an application using a corresponding transport stack, and processing a network packet received over a computer network using a corresponding transport stack (stack-interfacing module 822). Transport system 818 can also include instructions for creating and/or updating a transport stack based on stack requirements received from an application, a data packet, or a stack component (stack-updating module 824).

Transport system 818 can include instructions for selecting a stack component that satisfies a stack requirement, for example, from a local component repository, a remote component repository, or a component marketplace (component-selecting module 826). Further, transport system 818 can include instructions for obtaining a component from the local repository, the remote repository, the component marketplace, or a network packet from a remote network device (component-obtaining module 828). Transport system 818 can also include instructions for detecting when a newer version of a component becomes available, and updating the component in a stack with the newer version of the component (component-updating module 830).

Data 832 can include any data that is required as input or that is generated as output by the methods and/or processes described in this disclosure. Specifically, data 832 can store at least a stack-component repository, a transport framework, and a description for a set of transport stacks.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
   receiving an interest of an object in a network;
   obtaining a stack requirement for a protocol stack, wherein the stack requirement specifies at least a functionality for a stack component;
   selecting the stack component for the protocol stack, based on the functionality and at least a name prefix of the interest or the object;
   instantiating the stack component in the protocol stack; and
   processing a flow of network packets using the protocol stack.

2. The method of claim 1, wherein the stack component is selected based on a name of the interest or the object.

3. The method of claim 1, wherein the selecting includes:
   determining, from the stack requirement, a component requirement;
   determining, from a component repository, a set of components that satisfies the component requirement; and
   selecting, from the set of components, the stack component, which is compatible with other components in the protocol stack.

4. The method of claim 1, further comprising:
   searching for the stack component in a local repository; and
   responsive to determining that the stack component is not available in the local repository, obtaining the stack component from a remote repository.

5. The method of claim 4, wherein the remote repository includes one or more of:
   a component cache;
   a component storage server; or
   a component marketplace.

6. The method of claim 1, further comprising:
   determining that an updated version of the stack component exists;
   determining a protocol stack in which the stack component is instantiated; and
   replacing an instantiation of the stack component with an instantiation of the updated version of the stack component.

7. The method of claim 6, further comprising:
   analyzing the updated version of the stack component to obtain a stack requirement; and
   responsive to determining that the stack requirement of the stack component has changed, updating an implementation of the protocol stack to satisfy a new stack requirement.

8. A non-transitory computer-readable storage medium storing instructions that, when executed by a computer, cause the computer to perform a method, the method comprising:
   receiving an interest of an object in a network;
   obtaining a stack requirement for a protocol stack, wherein the stack requirement specifies at least a functionality for a stack component;
   selecting the stack component for the protocol stack, based on the functionality and at least a name prefix of the interest or the object;
   instantiating the stack component in the protocol stack; and
   processing a flow of network packets using the protocol stack.

9. The non-transitory computer-readable storage medium of claim 8, wherein the stack component is selected, based on a name of the interest or the object.

10. The non-transitory computer-readable storage medium of claim 8, wherein the selecting involves:
   determining, from the stack requirement, a component requirement;
   determining, from a component repository, a set of components that satisfies the component requirement; and
   selecting, from the set of components, the stack component, which is compatible with other components in the protocol stack.

11. The non-transitory computer-readable storage medium of claim 8, further comprising:
   searching for the stack component in a local repository; and
   responsive to determining that the stack component is not available in the local repository, obtaining the stack component from a remote repository.

12. The non-transitory computer-readable storage medium of claim 11, wherein the remote repository includes one or more of:
   a component cache;
   a component storage server; or
   a component marketplace.

13. The non-transitory computer-readable storage medium of claim 8, further comprising:
   determining that an updated version of the stack component exists;
   determining a protocol stack in which the stack component is instantiated; and
   replacing an instantiation of the stack component with an instantiation of the updated version of the stack component.

14. The non-transitory computer-readable storage medium of claim 13, further comprising:
   analyzing the updated version of the stack component to obtain a stack requirement; and
   responsive to determining that the stack requirement of the stack component has changed, updating an implementation of the protocol stack to satisfy a new stack requirement.

15. An apparatus comprising:
   a communication interface;
   a processor; and
   a memory configured to store instructions executable by the processor,
   wherein the processor is configured to:
      receive an interest of an object in a network;
      obtaining a stack requirement for a protocol stack, wherein the stack requirement specifies at least a functionality for a stack component;
      select the stack component for the protocol stack, based on the functionality and at least a name prefix of the interest or the object;
      instantiate the stack component in the protocol stack; and
      process a flow of network packets using the protocol stack.

16. The apparatus of claim 15, wherein the processor is further configured to:
   determine, from the stack requirement, a component requirement;
   determine, from a component repository, a set of components that satisfies the component requirement; and
   select, from the set of components, the stack component, which is compatible with other components in the protocol stack.

17. The apparatus of claim 15, wherein the processor is further configured to:
   search for the stack component in a local repository; and
   responsive to determining that the stack component is not available in the local repository, obtain the stack component from a remote repository.

18. The apparatus of claim 17, wherein the remote repository includes one or more of:
   a component cache;
   a component storage server; or
   a component marketplace.

19. The apparatus of claim 15, the processor is further configured to:
   determine that an updated version of the stack component exists;
   determine a protocol stack in which the stack component is instantiated; and
   replace an instantiation of the stack component with an instantiation of the updated version of the stack component.

20. The apparatus of claim 19, the processor is further configured to:
   analyze the updated version of the stack component to obtain a stack requirement; and
   responsive to determining that the stack requirement of the stack component has changed, update an implementation of the protocol stack to satisfy a new stack requirement.

* * * * *